(12) United States Patent
McQuiston et al.

(10) Patent No.: US 11,514,914 B2
(45) Date of Patent: Nov. 29, 2022

(54) SYSTEMS AND METHODS FOR AN INTELLIGENT VIRTUAL ASSISTANT FOR MEETINGS

(71) Applicant: JPMORGAN CHASE BANK, N.A., New York, NY (US)

(72) Inventors: Daniel D McQuiston, West Chester, PA (US); Aarti Narayanan, Bournemouth (GB); Dave Burrells, London (GB); Simon Burke, Ringwood (GB); Jan S Dabrowski, Dorset (GB); Rhys Dawes, Dorset (GB); Charlotte Knight, Lowdham (GB); Libby Kent, Brooklyn, NY (US); Sandeep Koul, Bangalore (IN); Uday Pant, Chicago, IL (US); Tony M Nazarowski, Elgin, IL (US); Aditi Vaidya, Pearland, TX (US); Ayush Kumar Bilala, Bhilwara Rajasthan (IN); Charanjith Allaparambil Chandran, Bangalore (IN); Prayag Godha, Navrangpura (IN); Nikhil Kotikanikadanam Madhusudhan, Bangaluru (IN); Chitra Pillai Sundaribai, Bournemouth (GB); Aditya Anil Upadhyay, Bath Road (GB); Eric Han Kai Chang, Wilmington, DE (US); Stefan Cristian Bardasu, Essex (GB); Erin Michelle Perry, Townsend (DE); Saifuddin Merchant, Claymont, DE (US); James P White, III, Middletown, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 260 days.

(21) Appl. No.: 16/782,612

(22) Filed: Feb. 5, 2020

(65) Prior Publication Data
US 2020/0258525 A1 Aug. 13, 2020

Related U.S. Application Data

(60) Provisional application No. 62/802,788, filed on Feb. 8, 2019.

(51) Int. Cl.
*G10L 15/26* (2006.01)
*G06Q 10/10* (2012.01)
(Continued)

(52) U.S. Cl.
CPC .......... *G10L 15/26* (2013.01); *G06Q 10/1095* (2013.01); *G10L 15/08* (2013.01); *G10L 15/30* (2013.01); *G10L 2015/088* (2013.01)

(58) Field of Classification Search
None
See application file for complete search history.

(56) References Cited

U.S. PATENT DOCUMENTS 6,490,558 B1 * 12/2002 Kahn ................. G10L 15/26
704/235
6,757,362 B1 * 6/2004 Cooper ............... H04M 3/527
379/88.16
(Continued)

OTHER PUBLICATIONS

International Search Report, dated Apr. 24, 2020, from corresponding International Application No. PCT/US2020/017445.
(Continued)

*Primary Examiner* — Neeraj Sharma
(74) *Attorney, Agent, or Firm* — Greenberg Traurig LLP

(57) ABSTRACT

Systems and methods for an intelligent virtual assistant for meetings are disclosed. In one embodiment, a system for an intelligent virtual assistant for meeting may include a server comprising at least one computer processor executing a
(Continued)

virtual assistant computer program; a communication server in communication with the server; and a plurality of communication devices in communication with the server and the communication server, wherein the communication server facilitates an electronic meeting with a plurality of attendees via the plurality of communication devices. The virtual assistant may receive at least an audio feed and a video feed of the electronic meeting in real-time, may transcribe the audio feed using a speech-recognition algorithm, may provide the transcription to at least one of the plurality of attendees, may receive an edited transcription, and may update the speech recognition algorithm based on the edited transcription.

20 Claims, 2 Drawing Sheets

(51) Int. Cl.
*G10L 15/08* (2006.01)
*G10L 15/30* (2013.01)

(56) References Cited

U.S. PATENT DOCUMENTS

| | | | | |
|---|---|---|---|---|
| 7,400,364 | B2* | 7/2008 | Chen | H04N 21/443 |
| | | | | 348/700 |
| 8,682,669 | B2* | 3/2014 | Suendermann | G10L 15/063 |
| | | | | 704/257 |
| 10,643,616 | B1* | 5/2020 | Corfield | G10L 15/32 |
| 10,649,529 | B1* | 5/2020 | Nekimken | G06F 1/1688 |
| 2002/0080926 | A1* | 6/2002 | Engelke | H04M 3/42391 |
| | | | | 379/88.01 |
| 2005/0033582 | A1* | 2/2005 | Gadd | G10L 15/26 |
| | | | | 704/E15.04 |
| 2007/0271086 | A1* | 11/2007 | Peters | G10L 15/32 |
| | | | | 704/E15.04 |
| 2011/0208507 | A1* | 8/2011 | Hughes | G06F 3/038 |
| | | | | 704/235 |
| 2013/0058471 | A1* | 3/2013 | Garcia | H04M 3/42221 |
| | | | | 379/202.01 |
| 2015/0262580 | A1* | 9/2015 | Bisani | G10L 15/26 |
| | | | | 704/235 |
| 2016/0093294 | A1* | 3/2016 | Kapralova | G10L 15/01 |
| | | | | 704/232 |
| 2017/0133007 | A1* | 5/2017 | Drewes | G10L 15/063 |
| 2018/0039634 | A1 | 2/2018 | Goldstein et al. | |
| 2018/0131904 | A1 | 5/2018 | Segal | |
| 2018/0137472 | A1 | 5/2018 | Gorzela et al. | |
| 2018/0191907 | A1 | 7/2018 | Herrin et al. | |
| 2018/0330730 | A1* | 11/2018 | Garg | G10L 15/1815 |
| 2019/0005946 | A1* | 1/2019 | Huang | G10L 15/04 |
| 2019/0341050 | A1* | 11/2019 | Diamant | H04N 7/155 |

OTHER PUBLICATIONS

Written Opinion of the International Searching Authority, dated Apr. 24, 2020, from corresponding International Application No. PCT/US2020/017445.

* cited by examiner

SYSTEMS AND METHODS FOR AN INTELLIGENT VIRTUAL ASSISTANT FOR MEETINGS

RELATED APPLICATIONS

This application claims priority to, and the benefit of, U.S. Provisional Patent Application Ser. No, 62/802,788, filed Feb. 8, 2019, the disclosure of which is hereby incorporated, by reference, in its entirety.

BACKGROUND OF THE INVENTION

1. Field of the Invention

The present disclosure relates to systems and methods for an intelligent virtual assistant for meetings, and more particularly to a virtual assistant to transcribe, record, and analyze discussions during a meeting.

2. Description of the Related Art

Meetings are an everyday part of conducting business. There may be countless meetings that an individual must attend. Meetings may take place in person, over the phone, through video conferencing, through specialized online meeting software such as Cisco WebEx, etc.

An individual may not have time for certain meetings and miss out on useful information discussed therein. Even when an individual does attend a meeting, the individual may be distracted, due to multitasking or otherwise. And even if the individual is not distracted, he or she may not remember what was said or decided at a meeting that took place days, weeks, or months ago. An individual may take notes of the meeting to help remember and record, but that individual may not be able to participate or listen as effectively in the meeting as a result.

Existing technology for meetings suffers from lost information and lost productivity of meeting participants. A need therefore exists for a means to automatically transcribe, record, and analyze discussions during a meeting.

SUMMARY OF THE INVENTION

Systems and methods for an intelligent virtual assistant for meetings are disclosed. In one embodiment, a system for an intelligent virtual assistant for meeting may include a server comprising at least one computer processor executing a virtual assistant computer program; a communication server in communication with the server; and a plurality of communication devices in communication with the server and the communication server, wherein the communication server facilitates an electronic meeting with a plurality of attendees via the plurality of communication devices. The virtual assistant may receive at least an audio feed and a video feed of the electronic meeting in real-time, may transcribe the audio feed using a speech-recognition algorithm, may provide the transcription to at least one of the plurality of attendees, may receive an edited transcription, and may update the speech recognition algorithm based on the edited transcription.

In one embodiment, the communication server may include a telephony server.

In one embodiment, the electronic meeting may include a video conference hosted by the communication server.

In one embodiment, the system may further include a storage device that stores at least the transcription and the edited transcription.

In one embodiment, the virtual assistant may analyze the transcription or the edited transcription for action items.

In one embodiment, the virtual assistant analyzes the transcription or the edited transcription for attendee sentiment.

In one embodiment, the virtual assistant may transcribe the audio feed in real-time.

According to another embodiment, in a virtual assistant executed by an information processing apparatus comprising at least one computer processor, a method for providing virtual assistant services to a meeting may include: (1) the virtual assistant receiving at least an audio feed and a video feed of an electronic meeting in real-time; (2) the virtual assistant transcribing the audio feed using a speech-recognition algorithm; (3) the virtual assistant providing the transcription to at least one of the plurality of attendees; (4) the virtual assistant receiving an edited transcription; and (5) the virtual assistant updating the speech recognition algorithm based on the edited transcription.

In one embodiment, the virtual assistant may provide the transcription to at least one attendee in real-time.

In one embodiment, the method may further include the virtual assistant analyzing the transcription or the edited transcription for action items.

In one embodiment, the method may further include the virtual assistant analyzing the transcription or the edited transcription for attendee sentiment.

In one embodiment, the method may further include the virtual assistant analyzing the transcription or the edited transcription and generating a summary of the electronic meeting.

In one embodiment, the method may further include sending the action item to an external software content collaboration system or software development tracking tool.

In one embodiment, the method may further include the virtual assistant identifying a trigger word in the audio feed; and executing function in response to the trigger word.

In one embodiment, the function may include sharing an attendee screen, recording an action item or capturing video, etc.

In one embodiment, the method may further include the virtual assistant analyzing a plurality of store transcriptions including the transcription or the edited transcription to identify similar attendees or similar projects.

In one embodiment, the method may further include the virtual assistant providing a cue to the attendees of the electronic meeting.

In one embodiment, the cue may be based on a schedule or agenda for the electronic meeting.

In one embodiment, the cue may be based on attendee participation.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
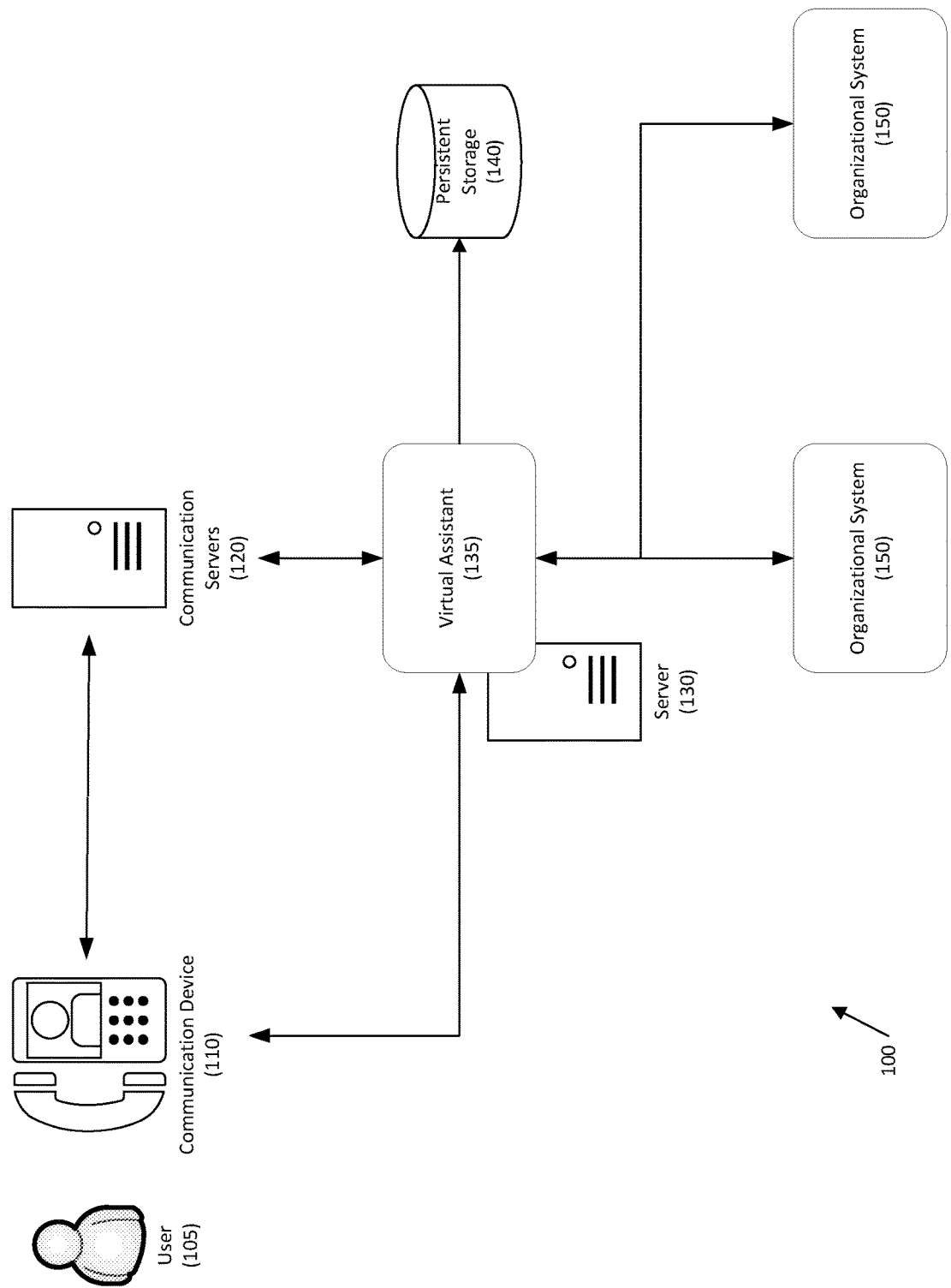
FIG. 1 depicts a system for automatically transcribing, recording, and analyzing discussions during a meeting according to an exemplary embodiment.

Exemplary embodiments will now be described in order to illustrate various features. The embodiments described herein are not intended to be limiting as to the scope, but rather are intended to provide examples of the components, use, and operation of the invention, FIG. 1 depicts a system for automatically transcribing, recording, and analyzing discussions during a meeting according to an exemplary embodiment. In one embodiment, system 100 may include one or more communication devices 110 associated with one or more users 105, one or more communications servers 115, one or more virtual assistant computing devices 120, one or more persistent storage devices 125, and one or more external systems, for example 130 and 135. Although only one user 105 and one communication device 110 is depicted in FIG. 1, any number of users 105 and communication devices 110 may be provided as is necessary and/or desired. In one embodiment, a plurality of users 105 may use the same communication device 110; in another embodiment, each user 105 may use his or her own communication device.

Communication devices 110 may be any suitable electronic device, including, for example, smartphones, videophones, smart watches, laptop computers, notebook computers, desktop computers, tablet computers, workstations, Internet of Things (IoT) appliances, teleconferencing equipment, videoconferencing equipment, etc.

In one embodiment, one or more communication device 110 may be an IP-based communication device, such as an IP phone. In another embodiment, the one or more communication device 110 may be any suitable device capable of recording audio, for example a microphone attached to a computing device, such as a laptop. Each user may use the same kind of communication device 110 or each user may be using a different kind of communication device 110.

Communication device 110 may be connected to one another in a call or meeting via the one or more communications servers 120 over one or more networks, which may be wide area networks, intranets, cellular networks, etc., or any other kind of network as desired. Communications servers 120 may be, for example, servers managing an IP phone service, enabling a teleconference between the plurality of users.

Virtual assistant 135 may also be connected to the meeting via communications servers 120. Virtual assistant 120 may be one or more computer programs executed by server 130, which may be a physical server, a cloud-based server, etc. In another embodiment, virtual assistant may be hosted by communication server 120, communication device 110, etc.

Virtual assistant 135 may record the audio and/or video from a meeting (received as a stream), identify individuals in the stream, transcribe the stream, identify action items in the stream, summarize the discussion in the stream, analyze the sentiment in the stream, and/or publish a recording and/or analysis of the stream to the attendees of the meeting, individuals that could not attend the meeting, etc. Sentiment analysis may be included in the meeting minutes and may provide commentary such as "John was happy about the pricing" or "Jill was concerned about project staffing."

In one embodiment, virtual assistant 135 may translate the raw transcript from a first language to a second language. In one embodiment, a user may select which language he or she would like the raw transcript translated into. Virtual assistant 135 may store the translated raw transcript and may send the translated raw transcript to one or more users.

In one embodiment, virtual assistant 135 may send a transcript of the stream to one or more user 105 for review and/or editing. User 105 may return an edited transcript to virtual assistant 135 for further analysis, storage, or to train or retrain machine leaning techniques.

Virtual assistant 135 may also be connected to one or more persistent storage device 140, which may include one or more servers.

In one embodiment, persistent storage device(s) 140 may be a part of server 130, may be physically connected to server 130, or may be remote servers connected to server 130 over one or more networks.

In one embodiment, virtual assistant 135 may send raw transcript 155 or edited transcript 160 of stream 140 to persistent storage device(s) 125.

Virtual assistant 135 may collect and analyze data from multiple meetings the streams or transcripts of which may be stored in persistent storage devices(s) 125 for trends. For example, virtual assistant 135 may suggest persons who may be interested in a meeting based on analysis of data from multiple meetings. Virtual assistant 135 may also identify one or more trend that certain individuals are always in meetings relating to a particular subject matter, for example subject matter experts. When a new meeting invite is sent out relating to that subject matter, or when that subject matter comes up during an on-going meeting, virtual assistant 135 may recommend to the host inviting the subject matter expert.

In one embodiment, virtual assistant 135 may interface with one or more organizational system 150. Examples of organizational systems 150 include software content collaboration systems (e.g., a Confluence system), software development tracking tools (e.g., a JIRA system), etc. Virtual assistant 135 may, for example, send action items discussed during the meeting to the organizational system(s) 150, or may otherwise publish the meeting data and analysis in part or in full.

Figure 2:
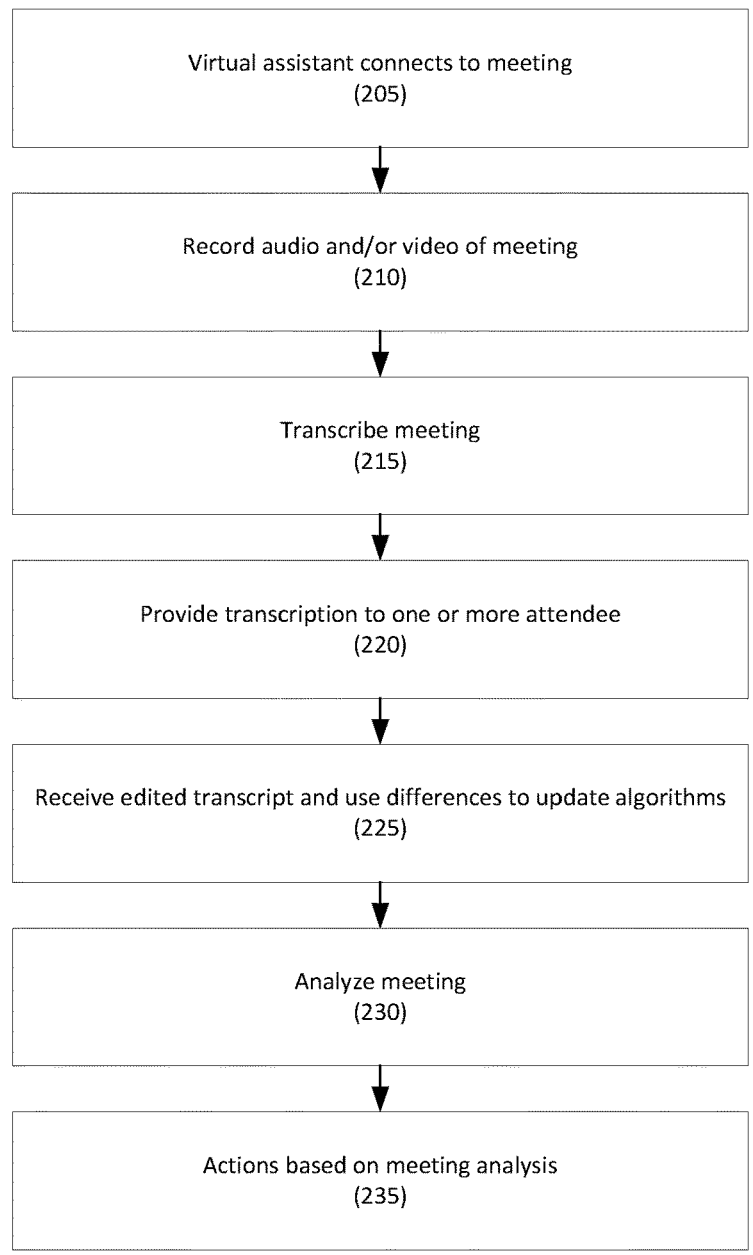
FIG. 2 depicts a method for automatically transcribing, recording, and analyzing discussions during a meeting according to an exemplary embodiment.

FIG. 2 depicts a method for automatically transcribing, recording, and analyzing discussions during a meeting according to an exemplary embodiment.

In step 205, a virtual assistant may connect to a meeting. The virtual assistant may be hosted locally to the meeting or may be hosted on a remote web server. The meeting may be in person, over the phone, through video conferencing, through specialized online meeting software such as Cisco WebEx, etc. The virtual assistant may be built into a meeting program or application or may be a stand-alone application.

In one embodiment, the virtual assistant may connect to the call or meeting via an audio recording device in the room of an in-person meeting. In another embodiment, the virtual assistant application may connect to the meeting as a participant, for example by calling into a telephone number. The virtual assistant may audibly announce its presence in the meeting.

In one embodiment, the virtual assistant may join the call or meeting according to a fixed schedule, upon a user's request, upon the click of a physical or virtual button, or by default on a particular call-in number or bridge.

In one embodiment, a user may schedule the virtual assistant to join a meeting through Microsoft Outlook (or any other software capable of sending meeting invites) when sending a meeting invite. At the time of the meeting, the virtual assistant may join in automatically based on the meeting details in the invite.

In step 210, the virtual assistant may record the audio and/or video of the meeting. In one embodiment, the audio and/or video may be stored.

In one embodiment, the virtual assistant may call pre-defined functions in response to certain trigger words spoken during the meeting. For example, if a user says the words "take action item," the virtual assistant may initiate a function to record or designate an action item. The virtual assistant application may also be connected directly to the meeting software, such that it may adjust settings and take action in the meeting software itself. For example, if a user says "share screen," the virtual assistant application may cause the meeting software to share that user's screen with the rest of the attendees. It may also capture a screen shot of the user's screen if, for example, video is not being captured.

In one embodiment, the virtual assistant may call pre-defined functions in response to a user manually triggering such functions. For example, a user may click a button, which may cause the virtual assistant to call a function to record an action item.

In one embodiment, the virtual assistant may provide audible and/or visual reminders or cues to keep the meeting progressing. For example, the virtual assistant may follow a schedule and may announce reminders as each phase of the schedule is about to expire, or has expired, so that all agenda items are discussed. Similarly, the virtual assistant may provide other indicators, such as periodic reminders of the time remaining in a meeting, recommendations (e.g., "time to wrap up the meeting"), announcements such as when an action item is identified, etc. The virtual assistant may cue attendees that may not be participating to participate. The meeting organizer may specify the types of reminders, indicators, and/or announcements for the virtual assistant to make.

In step 215, the virtual assistant may transcribe the audio of the meeting. The transcript may occur simultaneously with the meeting or may take place after the meeting is done, based on the audio recording. The virtual assistant may leverage natural language processing machine learning algorithms to convert the audio to text.

The virtual assistant may, for example, use a voice-to-text algorithm. In one embodiment, the voice-to-text-algorithm may use Nuance, IBM Watson technology, or any other suitable technology as is necessary and/or desired.

In one embodiment, the virtual assistant may translate the transcript of the meeting from a first language to a second language. In one embodiment, a user may select which language he or she would like the transcript translated to. The translated transcript may be sent to one or more users.

In one embodiment, the virtual assistant may identify individuals on the call based on one or more of: a meeting invite, telephone numbers on the call, voice recognition, and verbal self-identification. The virtual assistant may have pre-existing voice print library to match up with voice prints heard in the meeting. The virtual assistant may also add to the voice print library any voice prints detected on a call not already in the library. The virtual assistant may associate the identity of identified individuals on the call to their recorded words in the transcription.

In one embodiment, the virtual assistant may transcribe the audio and stream the transcription to the attendees in real-time. A live transcription provides greater accessibility to the meeting to, for example, attendees with disabilities, for example attendees with hearing or speech impairments.

In one embodiment, attendees receiving the live transcription may make corrections in the transcript. The virtual assistant may apply that correction in real-time. The virtual assistant may update the transcription algorithms based on the corrections.

In step 220, the virtual assistant may send the transcript to the meeting attendees or any other set of recipients as desired. The virtual assistant may email the transcript to meeting attends, for example, based on the email addresses in the meeting invite.

In one embodiment, the virtual assistant may first send a raw transcript to one or more individuals who attended the meeting.

In step 225, the individual(s) may validate the raw transcript or may edit and return edited transcript(s) to the virtual assistant. The virtual assistant may identify differences between the raw transcript and the edited transcript, and may use the differences to train the transcription algorithm.

In one embodiment, the virtual assistant may replace the raw transcript with the edited transcript.

In step 230, the virtual assistant may analyze the transcript and/or audio to generate one or more of a summary of the meeting, action items discussed or agreed to during the meeting, identity of persons that attended the meeting, time stamps for the transcript, and attendee sentiment(s) of the meeting. The virtual assistant may leverage machine learning to extract this information from the audio and transcript of the meeting. The virtual assistant may, for example, use a voice-to-text algorithm. In one embodiment, the voice-to-text-algorithm may use AWS Comprehend, Microsoft Azure Text Analytics API, Nuance, IBM Watson technology, or any other suitable technology as is necessary and/or desired.

In step 235, the virtual assistant may take additional actions based on the meeting analysis. For example, the virtual assistant may interface with systems, such as software content collaboration systems, software development tracking tools, etc., and output portions of the transcript, audio, or analysis to those systems. As another example, the virtual assistant may identify action items in the meeting transcript and automatically post these action items to such systems or tools as work items. As still another example, the virtual assistant may interface with calendaring programs to schedule follow-up meetings, task lists, etc. It may further generate travel arrangements as is necessary and/or desired.

In one embodiment, the virtual assistant may review other stored transcripts, summaries, etc. to identify other meetings that may include similar subject matter. For example, two separate groups may be working on similar projects, but may be unaware of the other group's work. The virtual assistant, or a virtual assistant backend, may identify groups working on similar subject matter, and may inform the groups of each other's existence. In one embodiment, keyword matching may be used to identify similar groups; other techniques may be used as is necessary and/or desired.

For example, by using the full transcript summaries, the system may analyze the summaries to see if there are any that are similar (e.g., having a 75% threshold match) and then take the humans that are identified as participating in the conversations and show a map of topics and humans and how they are tied together, whether loosely or tightly. In addition, the comparisons may be based on summaries, tags (e.g., important tags) etc., such as human or machine-tagged items.

In one embodiment, organizational policies or rules may be considered before groups are informed of each other.

One of ordinary skill in the art may readily appreciate that the disclosed virtual assistant embodiments may advantageously reduce lost time and efficiency caused by conventional meetings and note-taking. By automatically taking notes for a meeting, a virtual assistant may free up participants to participate without the distraction of note-taking. An attendee, or an absentee, may review the notes or transcript of the meeting a later date, thus avoiding lost information. Moreover, a virtual assistant may provide greater accessibility to persons with disabilities, for example hearing or speech impairments.

Hereinafter, general aspects of implementation of the systems and methods of the embodiments will be described.

The system of the embodiments or portions of the system of the embodiments may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the embodiments may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the embodiments.

The processing machine used to implement the embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the methods as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, C#, COBOL, dBase, Forth, Fortran, GoLang, Java, Modula-2, Pascal, Prolog, REXX, Rust, Visual Basic, and/or JavaScript, for example. Further, it is not necessary that a single type of instruction or single programming language be utilized in conjunction with the operation of the system and method of the embodiments. Rather, any number of different programming languages may be utilized as is necessary and/or desirable.

Also, the instructions and/or data used in the practice of the embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the embodiments.

Further, the memory or memories used in the processing machine that implements the embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the embodiments, a variety of "user interfaces" may be utilized to allow a user to interface with the processing machine or machines that are used to implement the embodiments. As used herein, a user interface includes any hardware, software, or combination of hardware and software used by the processing machine that allows a user to interact with the processing machine. A user interface may include a video player, a monitor, a TV, assistive technology, etc. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method of the embodiments may interact partially with another processing machine or processing machines, while also interacting partially with a human user.

It will be readily understood by those persons skilled in the art that the present embodiments are susceptible to broad utility and application. Many embodiments and adaptations other than those herein described, as well as many variations, modifications and equivalent arrangements, will be apparent from or reasonably suggested by the present embodiments and foregoing description thereof, without departing from the substance or scope of the invention.

Accordingly, while the present exemplary embodiments have been described here in detail, it is to be understood that this disclosure is only illustrative and exemplary and is made to provide an enabling disclosure of the invention. Accordingly, the foregoing disclosure is not intended to be construed or to limit the present embodiments or otherwise to exclude any other such embodiments, adaptations, variations, modifications or equivalent arrangements.

What is claimed is:

1. A system, comprising:
a server comprising at least one computer processor executing a virtual assistant computer program;
a communication server in communication with the server; and
a plurality of communication devices in communication with the server and the communication server, wherein the communication server facilitates an electronic meeting with a plurality of attendees via the plurality of communication devices;
wherein:
the virtual assistant computer program receives at least an audio feed and a video feed of the electronic meeting in real-time;
the virtual assistant computer program transcribes the audio feed using a speech recognition algorithm into a transcription of the electronic meeting;
the virtual assistant computer program provides the transcription to at least one of the plurality of attendees;
the virtual assistant computer program receives an edited version of the transcription comprising edits to contents of the transcription; and
the virtual assistant computer program updates the speech recognition algorithm based on the edited version of the transcription.

2. The system of claim 1, wherein the communication server comprises a telephony server.

3. The system of claim 1, wherein the electronic meeting comprises a video conference hosted by the communication server.

4. The system of claim 1, further comprising:
a storage device that stores at least the transcription and the edited version of the transcription.

5. The system of claim 1, wherein the virtual assistant computer program analyzes the transcription or the edited version of the transcription for action items.

6. The system of claim 1, wherein the virtual assistant computer program analyzes the transcription or the edited version of the transcription for attendee sentiment.

7. The system of claim 1, wherein the virtual assistant computer program transcribes the audio feed in real-time.

8. A method for providing virtual assistant services to a meeting, comprising:
in a virtual assistant computer program executed by an information processing apparatus comprising at least one computer processor:
the virtual assistant computer program receiving at least an audio feed and a video feed of an electronic meeting with a plurality of attendees in real-time;
the virtual assistant computer program transcribing the audio feed using a speech recognition algorithm into a transcription of the electronic meeting;
the virtual assistant computer program providing the transcription to at least one of the plurality of attendees;
the virtual assistant computer program receiving an edited version of the transcription comprising edits to contents of the transcription; and
the virtual assistant computer program updating the speech recognition algorithm based on the edited version of the transcription.

9. The method of claim 8, wherein the virtual assistant computer program provides the transcription to at least one attendee in real-time.

10. The method of claim 8, further comprising:
the virtual assistant computer program analyzing the transcription or the edited version of the transcription for action items.

11. The method of claim 8, further comprising:
the virtual assistant computer program analyzing the transcription or the edited version of the transcription for attendee sentiment.

12. The method of claim 8, further comprising:
the virtual assistant computer program analyzing the transcription or the edited version of the transcription and generating a summary of the electronic meeting.

13. The method of claim 10, further comprising:
sending the action items to an external software content collaboration system or software development tracking tool.

14. The method of claim 8, further comprising:
the virtual assistant computer program identifying a trigger word in the audio feed; and
executing function in response to the trigger word.

15. The method of claim 14, wherein the function comprises sharing an attendee screen.

16. The method of claim 14, wherein the function comprises recording an action item or capturing video.

17. The method of claim 8, further comprising:
the virtual assistant computer program analyzing a plurality of store transcriptions including the transcription or the edited version of the transcription to identify similar attendees or similar projects.

18. The method of claim 8, further comprising:
the virtual assistant computer program providing a cue to the attendees of the electronic meeting.

19. The method of claim 18, wherein the cue is based on a schedule or agenda for the electronic meeting.

20. The method of claim 18, wherein the cue is based on attendee participation.

* * * * *